United States Patent
Li et al.

(10) Patent No.: US 7,580,456 B2
(45) Date of Patent: Aug. 25, 2009

(54) PREDICTION-BASED DIRECTIONAL FRACTIONAL PIXEL MOTION ESTIMATION FOR VIDEO CODING

(75) Inventors: Jiang Li, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 11/069,795

(22) Filed: Mar. 1, 2005

(65) Prior Publication Data

US 2006/0198445 A1    Sep. 7, 2006

(51) Int. Cl.
  *H04B 1/66* (2006.01)
(52) U.S. Cl. ............. 375/240; 375/240.16; 375/240.13; 375/240.17; 375/240.24
(58) Field of Classification Search ............ 375/240.16, 375/240.24, 240.17, 240.13
  See application file for complete search history.

(56) References Cited

U.S. PATENT DOCUMENTS

2004/0264572 A1* 12/2004 Sato et al. ............. 375/240.16
2005/0207663 A1* 9/2005 Zeng et al. ................... 382/236
2006/0002474 A1* 1/2006 Au et al. ................ 375/240.16

* cited by examiner

*Primary Examiner*—Shuwang Liu
*Assistant Examiner*—Kabir A Timory
(74) *Attorney, Agent, or Firm*—Lee & Hayes, PLLC (57) ABSTRACT

Motion-compensated video coding that employs prediction-based directional fractional pixel motion estimation is described. The fractional pixel motion estimation uses prediction-based searching and directional searching to search for candidate sub-pixel motion vectors oriented in a certain direction. With prediction-based searching, sub-pixel motion vectors are predicted using two techniques—median prediction and up-layer prediction. The search may be terminated early if a sub-pixel motion vector with sufficiently minimum cost is found. If prediction-based searching does not produce such a sub-pixel motion vector, the directional searching examines points in the predicted direction, rather than all eight possible neighboring points, to reduce the number of search points. Because the prediction-based directional fractional pixel motion estimation does not involve examination of neighboring integer pixel points, it can be used with any integer pixel motion estimation algorithm.

9 Claims, 5 Drawing Sheets

PREDICTION-BASED DIRECTIONAL FRACTIONAL PIXEL MOTION ESTIMATION FOR VIDEO CODING

TECHNICAL FIELD

This disclosure relates to video coding, and particularly, to video coding that uses motion estimation.

BACKGROUND

Efficient and reliable delivery of media content is increasingly important with the growth in popularity of downloading music and video over the Internet. Video is very appealing because it offers a much richer user experience than static images and text. It is more interesting, for example, to watch a video clip of a winning touchdown or a Presidential speech than it is to read about the event in stark print. Unfortunately, video data is significantly larger than other data types commonly delivered over the Internet. As an example, one second of uncompressed video data may consume one or more Megabytes of data. Delivering such large amounts of data over error-prone networks, such as the Internet and wireless networks, presents difficult challenges in terms of both efficiency and reliability.

To promote efficient delivery, video data is typically encoded prior to delivery to reduce the amount of data actually being transferred over the network. Image quality is lost as a result of the compression, but such loss is generally tolerated as necessary to achieve acceptable transfer speeds. In some cases, the loss of quality may not even be detectable to the viewer.

Video compression is well known. One common type of video compression is a motion-compensation-based video coding scheme, which is used in such coding standards as MPEG-1, MPEG-2, MPEG-4, H.261, H.263, and H.264.

In general video coding systems, motion estimation efficiently eliminates temporal redundancy between adjacent frames. Unfortunately, motion estimation is also responsible for consuming a large amount of computation resources in a video coder. This is especially true for the video coding standard H.264, where motion estimation accounts for most of the encoder complexity. This standard uses a macroblock structure with seven different block sizes, and performs fractional pixel searching at ¼-pixel accuracy. Simplifying the motion estimation process in such video coding processes would be helpful for real-time applications.

In video coding standard H.264, the motion estimation process is separated into two phases: (1) integer pixel motion estimation and (2) fractional pixel motion estimation. Generally, integer pixel motion estimation is responsible for most of the computational cost of the whole motion estimation. However, with the development of fast integer motion estimation algorithms, the computational cost of integer pixel motion estimation has been significantly reduced. Fast integer motion compensation algorithms are described in the following articles:

- Z. Zhou, M. T. Sun and Y. F. Hsu, "Fast variable block-size motion estimation algorithms based on merge and split procedures for H.264/MPEG-4 AVC," *Proc. of ISCAS* 2004, pp. 725-728, May 2004. Other
- C. Zhu, X. Lin, L. P. Chau, K. P. Lim, H. A. Ang, and C. Y. Ong, "A novel hexagon-based search algorithm for fast block motion estimation," *Proc. of ICASSP* 2001, vol. 3, pp 1593-96, May 2001.
- A. Tourapis, "Enhanced predictive zonal search for single and multiple frame motion estimation," In *Proc. of VCIP* 2002, pp. 1069-79, Jan. 2002.
- Z. B. Chen, P. Zhou, and Y. He, "Fast integer pel and fractional pel motion estimation for JVT," *JVT-F*017, 6th meeting: Awaji, Japan, 5-13 Dec. 2002.

While fractional pixel motion estimation has traditionally accounted for less of the computational cost, and with the advance of better techniques for integer pixel motion estimation, the computational cost of fractional pixel motion estimation is becoming comparable to that of integer pixel motion estimation and hence significant to the whole estimation process. In some cases, fractional pixel motion estimation can account for more computational costs than integer pixel motion estimation.

Accordingly, there is a need to improve fractional pixel motion estimation to thereby simplify the entire motion estimation process in video coding.

SUMMARY

Motion-compensated video coding that employs prediction-based directional fractional pixel motion estimation is described. The fractional pixel motion estimation uses prediction-based searching and directional searching to search for candidate sub-pixel motion vectors oriented in a certain direction. With prediction-based searching, sub-pixel motion vectors are predicted using two techniques—median prediction and up-layer prediction. The search may be terminated early if a sub-pixel motion vector with sufficiently minimum cost is found. If prediction-based searching does not produce such a sub-pixel motion vector, the directional searching examines points in the predicted direction, rather than all eight possible neighboring points, to reduce the number of search points. Because the prediction-based directional fractional pixel motion estimation does not involve examination of neighboring integer pixel points, it can be used with any integer pixel motion estimation algorithm.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to video coding techniques that employ motion estimation. In certain video coding standards, such as H.264, motion estimation includes two separate estimations: (1) integer pixel motion estimation and (2) fractional pixel motion estimation.

Figure 1:
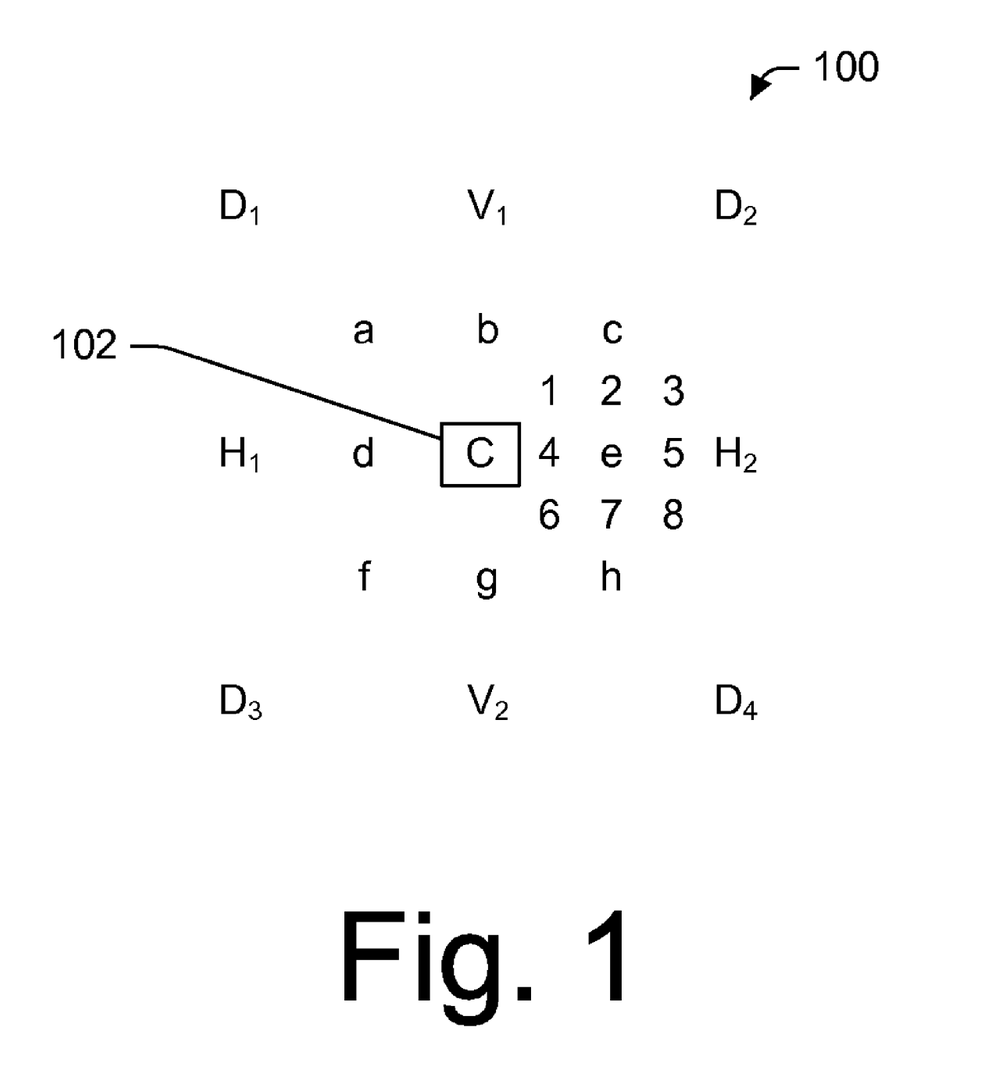
FIG. 1 illustrates a pixel layout to demonstrate fractional pixel motion estimation.

To illustrate what is meant by integer and fractional pixels, FIG. 1 shows a pixel layout 100 in which nine integer pixel positions are represented by capital letters C, $D_1$-$D_4$, $H_1$-$H_2$, and $V_1$-$V_2$. The integer pixel positions include a center pixel position C (referenced by number 102 and set off in a box), two horizontal pixel positions $H_1$ and $H_2$ to the left and right of the center pixel position, two vertical pixel positions $V_1$ and $V_2$ above and below the center pixel position, and four diagonal pixel positions $D_1$-$D_4$. Lower case letters a, b, . . . , h represent ½-pixel positions about the center pixel position C. Numbers 1, 2, . . . , 8 represent ¼-pixel positions about the ½-pixel position e. The ½-pixel and ¼-pixel resolutions are provided for exemplary purposes, and other fractional resolutions may be used.

Fractional pixel motion estimation has conventionally used a full fractional pixel search (FFPS) process. The FFPS process first examines all eight ½-pixel positions a, b, . . . , h surrounding the best integer pixel position C to identify the best ½-pixel motion vector (MV). Suppose the search results in a ½-pixel motion vector directed to position e. Next, the search process evaluates all eight ¼-pixel positions 1, 2, . . . , 8 surrounding the best ½-pixel position e to obtain the best ¼-pixel MV. As a result, the conventional FFPS process requires 16 sub-pixel search points consisting of eight ½-pixel positions a-h and eight ¼-pixel positions 1-8 to obtain the best ¼-pixel motion vector.

The video coding techniques described in this disclosure employs prediction-based directional fractional pixel motion estimation to predict sub-pixel motion vectors. As the name implies, the fractional pixel motion estimation attempts to identify a sub-pixel motion vector using prediction-based searching and directional searching in a way that limits the search of candidate sub-pixel motion vectors to points in a certain direction. The process eliminates many of the search points in comparison to the full fractional pixel search (e.g., less than 16 positions are searched for the ¼-pixel accuracy), thus providing a more efficient coding process with computational cost.

With prediction-based searching, sub-pixel motion vectors are predicted using two techniques—median prediction and up-layer prediction. The search may be terminated early if a sub-pixel motion vector with sufficiently minimum cost is found. If prediction-based searching fails to produce a sub-pixel motion vector with sufficiently minimum cost, the directional searching examines points in the predicted direction, rather than all eight possible neighboring points. Because the prediction-based directional fractional pixel motion estimation does not involve examination of neighboring integer pixel points, it can be used with any integer pixel motion estimation algorithm.

The following disclosure first describes an exemplary system architecture for encoding video data for distribution. Following the architecture, the disclosure explains prediction-based directional fractional pixel motion estimation.

Exemplary System Architecture

Figure 2:
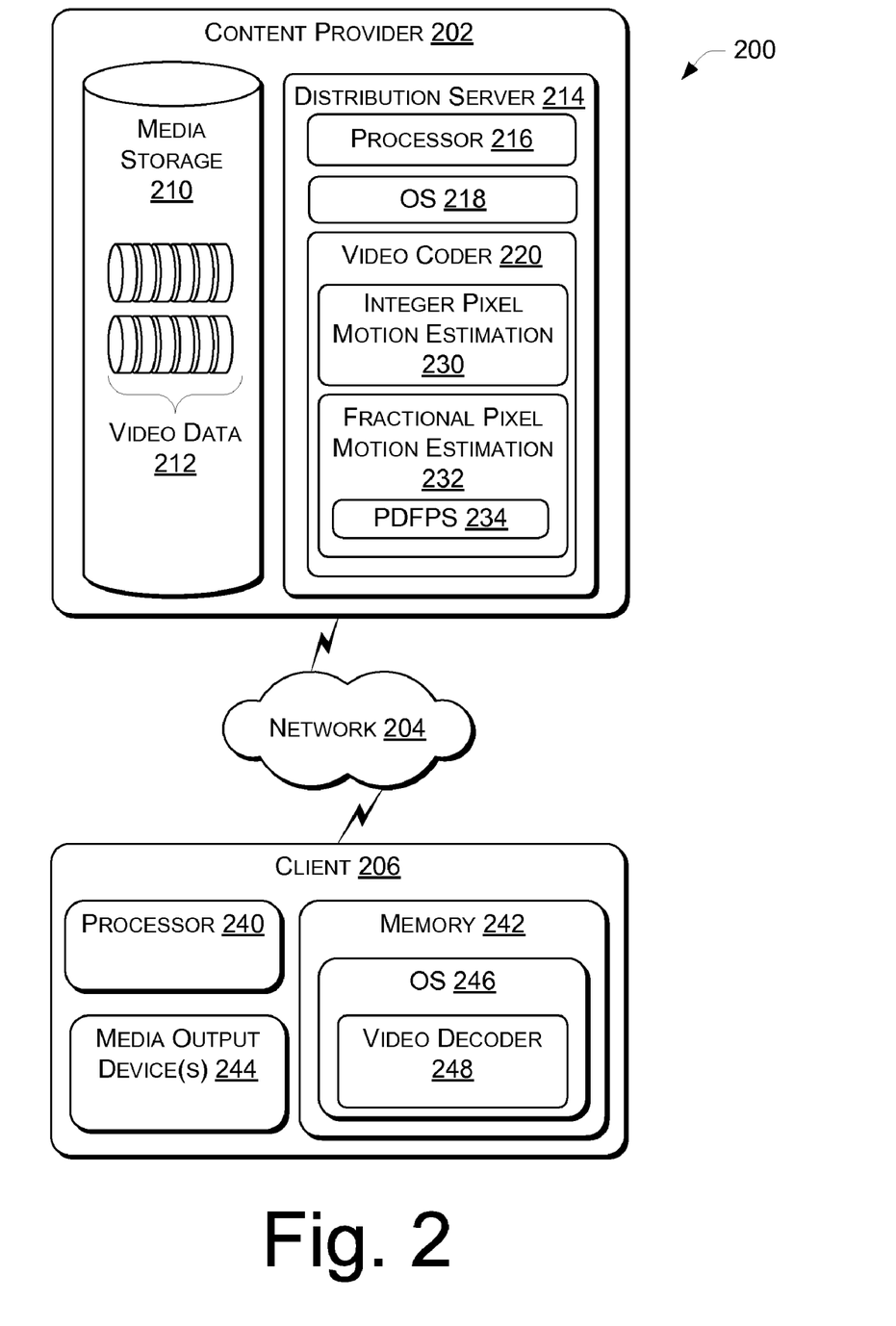
FIG. 2 illustrates an exemplary media distribution system in which a video coder that uses prediction-based directional fractional pixel motion estimation may be implemented.

FIG. 2 shows a media distribution system 200 in which a content producer/provider 202 produces and/or distributes media content over a network 204 to a client 206. The network is representative of many different types of networks, including the Internet, a local area network (LAN), a wide area network (WAN), a storage area network (SAN), cable network, and wireless networks (e.g., satellite, cellular, RF, etc.).

The content producer/provider 202 may be implemented in numerous ways, including as one or more server computers configured to store, process, and distribute media content. The content producer/provider 202 has media storage 210 to store digital content, including video files 212. The content producer/provider 202 also has a distribution server 214 to encode the media and distribute it over the network 204. The server 214 has a processor 216, an operating system 218, and a video encoder 220. The video encoder 220 may be implemented in software, firmware, and/or hardware. The encoder 220 is shown as a separate standalone module for discussion purposes, but may be constructed as part of the processor 216 or incorporated into operating system 218 or other applications (not shown).

The video encoder 220 encodes the video data 212 using a motion-estimation-based coding scheme. More specifically, the encoder 220 employs a motion-estimation video coding scheme that implements prediction-based directional fractional pixel motion estimation. The video encoder 220 has an integer pixel motion estimation module 230 and a fractional pixel motion estimation module 232. The fractional pixel motion estimation module 232 implements a Prediction-based Directional Fractional Pixel Search (PDFPS) algorithm 234, which will be described in more detail below.

The client 206 is equipped with a processor 240, a memory 242, and one or more media output devices 244. The memory 242 stores an operating system 246 that executes on the processor 240. The operating system 246 implements a client-side video decoder 248 to decode the video. Following decoding, the client stores the video in memory and/or plays the video via the media output devices 244. The client 206 may be embodied in many different ways, including as a computer, an entertainment device, a set-top box, a television, a portable media device, one or more application specific integrated circuits (ASIC), and so forth.

Video Coding with Fractional Pixel Motion Estimation

The video encoder 220 encodes video data using a motion-estimation-based coding scheme. In this scheme, blocks in an image that are moving from frame to frame are identified. To reduce the amount of data for representing each frame, each block's motion is predicted from a current frame to its previous frame and this motion is described by a motion vector (MV). The motion vector is two dimensional, with (x, y) coordinates, and describes a shift length and a direction. Shift length defines how much the block has moved from the previous frame, and the direction indicates in which direction the block is moving in the image.

With motion estimation, rather than compressing each and every frame (which yields a comparatively low compression efficiency), the image in each frame is divided into multiple blocks, typically of N×N pixels (e.g., 16×16 pixels). For each block, the video coder attempts to determine how the pixels in the block have moved from one frame to the next. The motion vector describes this movement. For purposes of this disclosure, the term "pixel" is used throughout to mean a picture element, and can be used interchangeably with the term "pel", as the terms are intended to mean the same thing.

As noted above, in some video coding standards, such as H.264, the motion estimation includes two separate estimations: (1) integer pixel motion estimation and (2) fractional pixel motion estimation. The motion estimation predicts a motion vector, and this predicted motion vector includes information of a predicted integer pixel motion vector and predicted fractional pixel motion vector.

The motion of an object is expected to continue from one frame to the next. Thus, the estimation modules 230 and 232 consider the motion vector of the previous frame as a starting point for finding the best motion vector. Identification of the best motion vector involves predicting a candidate motion vector, computing the change in pixels using the candidate motion vector, and calculating error residuals. The candidate motion vector that yields the lowest residuals for all pixels in a block, and hence has the lowest cost, is deemed the best motion vector.

The integer pixel motion estimation module 230 estimates motion at the integer pixel level of accuracy. The integer pixel motion estimation module 230 uses the predicted motion vector as its initial search point to estimate the best integer motion vector. With reference to FIG. 1, the integer pixel motion estimation concerns identifying vectors with points at integer pixel positions $D_1$-$D_4$, $H_1$-$H_2$, and $V_1$-$V_2$.

The fractional pixel motion estimation module 232 estimates motion at the sub-pixel level, such as ½-pixel or ¼-pixel accuracy. As shown in FIG. 1, fractional pixel motion estimation at the ½-pixel accuracy involves identifying vectors with points at ½-pixel positions a, b, . . . , h. Fractional pixel motion estimation at the ¼-pixel accuracy concerns identifying motion vectors with points at ¼-pixel pixel positions 1, 2, . . . , 8.

The fractional pixel motion estimation module 232 implements a prediction-based directional fractional pixel search (PDFPS) algorithm 234 that employs prediction-based searching and directional searching to derive a fractional pixel motion vector. Prediction-based searching starts its search from the predicted position of the integer pixel MV under the assumption that if the predicted integer pixel MV is the best MV after integer pixel motion estimation, the predicted fractional pixel MV is also likely to be the best fractional pixel MV. Even if the predicted integer pixel MV is not the best MV after integer pixel motion estimation, the module 232 uses directional searching that exploits the directional information of the predicted fractional pixel MV to evaluate points in its direction, rather than all possible points. This process reduces the number of search points, making the estimation less computationally intensive. The two search strategies—prediction and directional—are described below in more detail.

Prediction-Based Search

Prediction-based searching uses trial-and-error techniques to choose a motion vector and then calculate residues to determine whether the motion vector can be deemed the best. The motion vector that yields the lowest residues is deemed the best motion vector. The prediction-based directional fractional pixel search algorithm 234 predicts the sub-pixel motion vector using two kinds of prediction: median prediction and up-layer prediction.

Figure 3:
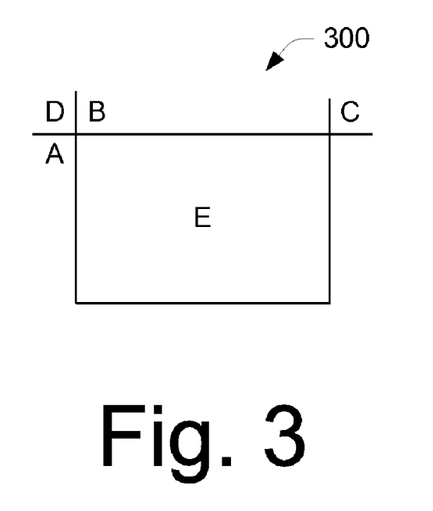
FIG. 3 illustrates a block from a block structure to demonstrate how the video coder uses median prediction in a search for a sub-pixel motion vector to be used in fractional pixel motion estimation.

FIG. 3 illustrates median prediction for an exemplary block in a block structure 300. Block E represents a two-dimensional X-by-Y set of pixels, where X may or may not equal Y (e.g., 16×16, 8×16, 4×4, etc.). Portions of adjacent blocks A, B, C, and D are also shown. Each of these previous blocks A-D has been processed and associated motion vectors for those blocks have been determined. To predict a motion vector for block E, the search algorithm 234 computes a median motion vector value from the motion vectors of the adjacent blocks. In one implementation, the search algorithm 234 uses block A on the left, block B on the top, block C diagonally to the top-right, and block D diagonally to the top-left. The median motion vector value provides a particular direction for the motion vector and the corresponding sub-pixel position in that direction is used as the initial search position in an attempt to find the best sub-pixel MV.

Given the predicted motion vector, $pred_{13}$ mv, and the best integer pixel motion vector, $int_{13}$ $pred_{13}$ mv, the predicted fractional pixel motion vector, $frac_{13}$ $pred_{13}$ mv, at a ¼-pixel unit is extracted as follows:

$$frac_{13}\,pred_{13}\,mv = (pred_{13}\,mv - int_{13}\,pred_{13}\,mv) \bmod 4$$

Other sub-pixel positions can be tried as well, with the best sub-pixel MV being the one that is directed to the sub-pixel position that yields the smallest value for $frac_{13}$ $pred_{13}$ mv.

Figure 4:
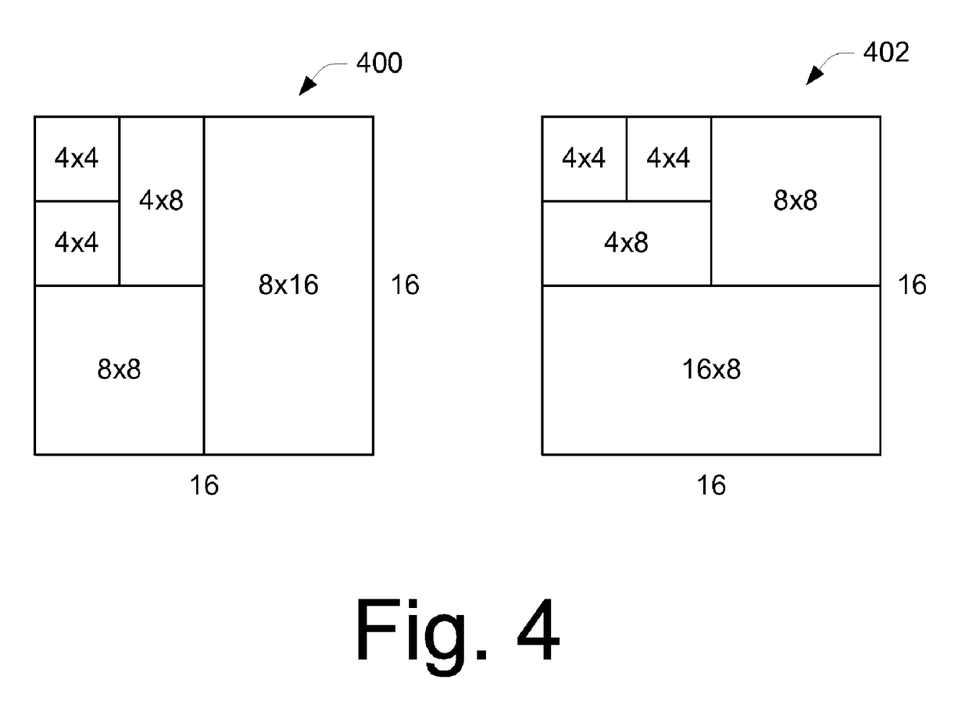
FIG. 4 illustrates two exemplary macroblock structures to demonstrate how the video coder uses up-layer prediction in a search for a sub-pixel motion vector to be used in fractional pixel motion estimation.

FIG. 4 illustrates up-layer prediction for two example macroblock structures 400 and 402. In each macroblock, there are seven block sizes varying from a large 16×16 block to two small 4×4 blocks. Up-layer prediction is based on the premise that large blocks and the small blocks contained therein are likely to have similar motion. That is, if the larger block has motion in one direction, it is likely that the smaller block within that larger block will have similar motion in that direction. To utilize the relationship of motion among various blocks, the motion vector of a larger block is used as a starting point for finding the sub-pixel motion vector for a smaller block contained in the larger block. In this example, the 16×16 block is up-layer of the 8×16 block of macroblock 400 and the 16×8 block of macroblock 402. Thus, the motion vector for the larger 16×16 block is used as the starting MV for the contained 8×16 or 16×8 blocks. Similarly, the 8×16 and 16×8 blocks are up-layer of the 8×8 blocks in both macroblocks 400 and 402 and hence, the motion vectors for these larger blocks can be used to predict the motion vectors for the contained smaller 8×8 blocks.

Once again, the predicted fractional pixel motion vector, $frac_{13}$ $pred_{13}$ mv, is extracted at a ¼-pixel unit as follows:

$$frac_{13}\,pred_{13}\,mv = (pred_{13}\,mv - int_{13}\,pred_{13}\,mv) \bmod 4$$

where, $pred_{13}$ mv is the predicted motion vector and $int_{13}$ $pred_{13}$ mv is the best integer pixel motion vector.

In the illustrated macroblocks 400 and 402, a block of size 16×16 does not have a larger block for use in up-layer prediction. Instead, for the largest block in the macroblock, the motion vector of the corresponding block at the same position in the previous frame is employed as the starting motion vector. The vector from the previous frame is selected because the motion trajectory of a moving object is assumed continuous in natural video sequences, and hence use of the previous frame's motion vector represents a plausible up-layer prediction for the largest-size block.

It is further noted that the median prediction or up-layer prediction may be used exclusively of each other as a way to predict the fractional pixel motion vector. Alternatively, both median prediction and up-layer prediction may be used to predict the fractional pixel motion vector.

Early Termination

To further improve coding efficiency, the prediction-based search may be terminated early if a sub-pixel motion vector with sufficiently minimum cost is found. This would occur, for example, when the best sub-pixel motion vector is one of the predicted motion vectors. Accordingly, identifying blocks whose best motion vector is exactly the predicted motion vector can be used to trigger early termination.

The module 232 implements early termination by comparing the costs of predicted motion vectors for various blocks to predefined thresholds for associated with those blocks. For the macroblocks 400 and 402 of FIG. 4, for example, thresholds $TH_i$ (i=1-7) for the seven block sizes can be defined. To demonstrate this process, suppose a predicted vector block (PVB) is define as a block in which its best motion vector is exactly the predicted motion vector. If a block in the macroblock structure is a PVB, it is likely to have a small cost at one of the sub-pixel motion vectors predicted using median prediction or up-layer prediction. The thresholds are then used to determine if the cost is small enough.

During the prediction-based searching, the predicted sub-pixel motion vectors produced from median prediction and up-layer prediction are examined and compared to the thresholds for the blocks. If the cost of either predicted sub-pixel motion vector is less than its associated threshold (i.e., Cost<$TH_i$), the block is deemed a predicted vector block and the search is terminated early. Terminating the search early reduces the computation costs of the motion estimation process.

Small Diamond Search Pattern

Figure 5:
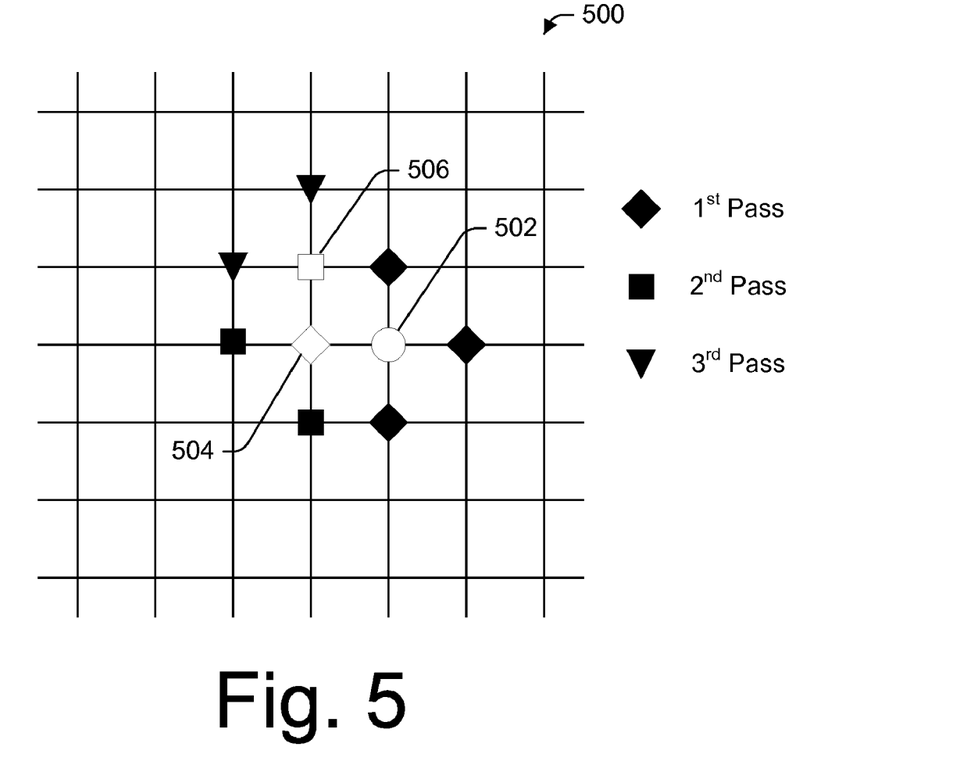
FIG. 5 illustrates a fractional pixel grid to demonstrate a small diamond search pattern (SDSP) searching technique.

If the search is not terminated early and further refinement is desired to identify the best sub-pixel motion vector, a fractional-pixel small diamond search pattern (SDSP) search may be added. FIG. 5 illustrates a fractional pixel grid 500 where individual fractional points are represented at each intersection of a horizontal line and a vertical line. The SDSP search begins at a starting point 502 represented by a circle. At each step, the search examines four points surrounding the current position. In a first pass, the fractional pixel locations to the left, right, above, and below the starting point 502 are evaluated, as represented by the diamond symbols. The point with the minimum distortion of the four is selected and used as the center of the next iteration. In this example, the first point with minimum distortion is point 504. The points with minimum distortion are represented in FIG. 5 by the empty symbols, whereas the other points are represented by solid black symbols.

In the second pass, the fractional pixel locations to the left, right, above, and below the first point 504 are evaluated, as represented by the square symbols. The search process iterates until the point with the minimum distortion is the SDSP center or the number of iterations reaches a preset limit (e.g., 3). In this example, a third pass is made about second point 506, as represented by the triangle symbols.

Prediction of the best sub-pixel motion vectors is improved by adding the small diamond search pattern search of FIG. 5 to the median prediction and/or up-layer prediction. Accuracy is further improved if the SDSP search is repeated multiple passes, from a single-pass (represented by diamonds) to a two-pass (represented by diamonds and squares) to a three-pass (represented by diamonds, squares, and triangles).

Directional Search

If the predicted integer pixel motion vector does not yield the best motion vector after integer pixel motion estimation, the fractional pixel motion estimation module 232 can still use the directional information of the predicted sub-pixel motion vectors to reduce the number of search points.

Figure 6:
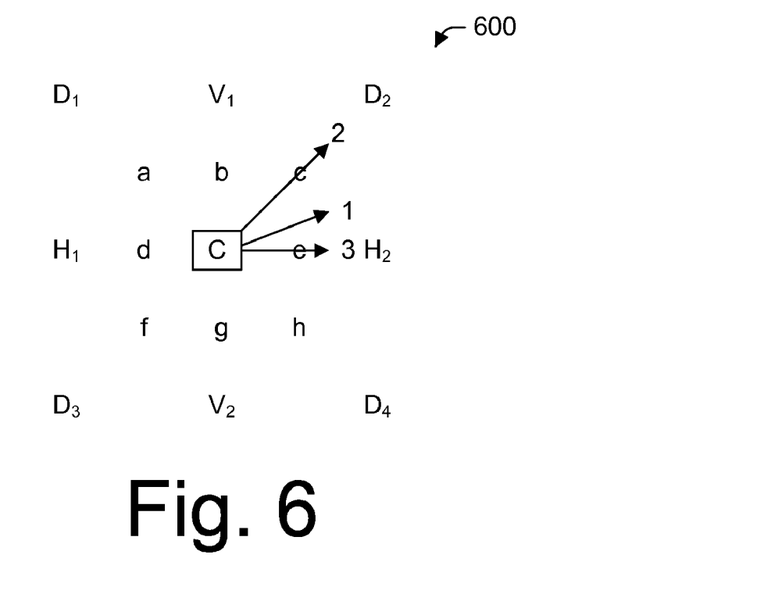
FIG. 6 illustrates a directional searching technique used by the video coder in a search for a sub-pixel motion vector to be used in fractional pixel motion estimation.

FIG. 6 illustrates a pixel layout 600 at the ½-pixel resolution, with notations similar to that employed in FIG. 1. Capital letters C, $D_1$-$D_4$, $H_1$-$H_2$, and $V_1$-$V_2$ represent integer pixel positions and lower case letters a, b, . . . , h represent ½-pixel positions. The directional search examines ½-pixel points in the direction of the predicted sub-pixel motion vectors. If the predicted motion vector is zero, directional search checks only the search center C.

Three exemplary predicted motion vectors 1, 2, and 3 are illustrated in FIG. 6 for discussion purposes. If the direction of the predicted motion vector is represented by vector 1, the directional search checks the ½-pixel positions c and e. If the direction of the predicted motion vector is represented by vector 2, the directional search checks point c. If the direction of the predicted motion vector is represented by vector 3, the directional search checks point e.

Other directions are processed in a similar way. After checking the ½-pixel motion vectors as described above, the one with the minimum cost is selected as the best ½-pixel motion vector. The motion vector can be further refined using the previously described small diamond search pattern to obtain the final ¼-pixel MV.

Prediction-based Directional Fractional Pixel Search Process

Figure 7:
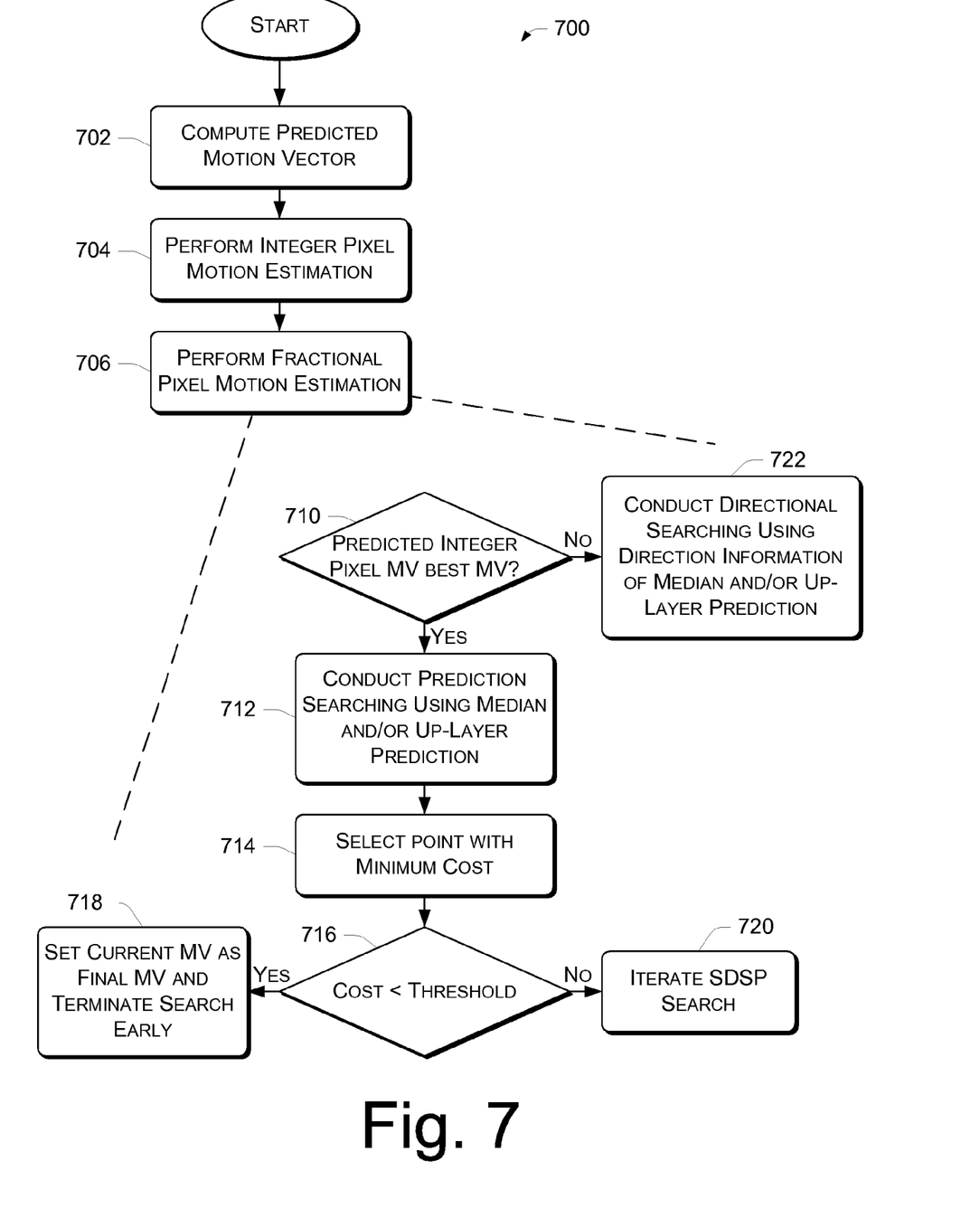
FIG. 7 is a flow diagram of a process for performing motion estimation in video coding.

FIG. 7 shows a process 700 for performing motion estimation in video coding. The process 700 is illustrated as a collection of blocks in a logical flow graph, which represent a sequence of operations that can be implemented in hardware, software, or a combination thereof. In the context of software, the blocks represent computer instructions that, when executed by one or more processors, perform the recited operations.

For discussion purposes, the process 700 is described with reference to the architecture 200 shown in FIG. 2. It is noted that the process 700 may be implemented in other environments and by other devices and architectures.

At block 702, the video coder 220 computes a predicted motion vector for an object in a video sequence. The predicted motion vector includes information of predicted integer pixel MV and predicted fractional pixel MV. At block 704, the integer pixel motion estimation module 232 estimates motion at the integer pixel level. It uses the predicted motion vector as its initial search point and attempts to estimate the best integer pixel motion vector.

At block 706, the fractional pixel motion estimation module 232 estimates motion at the sub-pixel level, such as ½-pixel or ¼-pixel accuracy. The fractional pixel motion estimation module 232 implements the prediction-based directional fractional pixel search described above that employs both prediction and directional searching. The prediction-based directional fractional pixel search is illustrated as operations 710-722.

At block 710, there is a determination whether the predicted integer pixel MV is the best integer pixel MV after integer pixel motion estimation at block 704. If it is (i.e., the "Yes" branch from block 710), the predicted fractional pixel MV is also likely to be the best fractional pixel MV. Thus, the fractional pixel motion estimation module 232 conducts prediction-based searching at the sub-pixel level using median prediction and/or up-layer prediction based on the best integer pixel MV to predict the fractional pixel MV (block 712). One median prediction technique is shown in FIG. 3, where a median motion vector value for block E is computed from the motion vectors of adjacent blocks, including block A on the left, block B on the top, and block C to the top-right or block D to the top-left. An up-layer prediction technique is shown in FIG. 4, where the motion vectors for larger blocks in a macroblock structure are used to predict the motion vectors for the contained smaller blocks.

At block 714, the point which yields the sub-pixel motion vector with the minimum cost, $Cost_{min}$, is selected. The search may be terminated early if the minimum cost is less than a predefined threshold ($cost_{min}$<TH). At block 716, the minimum cost of the selected point is compared to the threshold. If less (i.e., the "Yes" branch from block 716), the current motion vector is deemed the best motion vector and the search is terminated early (block 718). Conversely, if the cost is note less than the threshold ((i.e., the "No" branch from block 716), the fractional pixel motion estimation module 232 iterates a small diamond search pattern (SDSP) search around the selected point until the minimum cost point locates at the SDSP center (block 720). The SDSP search is illustrated in FIG. 5. Additionally, the number of iterations may be set to a limit (e.g., 3) to balance improved accuracy with computational costs.

With reference again to block 710, if the predicted integer pixel MV is not the best MV after integer pixel motion estimation (i.e., the "No" branch from block 710), the module 232 conducts directional searching based on the directional information of the predicted fractional pixel MV (block 722). That is, rather than checking all possible sub-pixel positions (e.g., 8 positions), the module 232 uses the direction information obtained from the median prediction and/or up-layer prediction to evaluate the sub-pixel positions in the same direction. One example of directional searching is provided above with reference to FIG. 6. The process reduces the number of search points, making the estimation less computationally intensive.

Once the integer pixel motion vector and fractional pixel motion vector are computed, the motion vectors are used to encode the video data.

Exemplary Algorithm

One exemplary implementation of the prediction-based directional fractional pixel search (PDFPS) algorithm 234 is provided below in Table 1. The algorithm uses both prediction searching and directional searching, and optionally employs early termination and small diamond search pattern searching. For convenience, blocks whose best integer pixel MV is equal to the integer part of the median predicted MV or the up-layer predicted MV are defined as Median Predicted Blocks (MPB) or Up-layer Predicted Blocks (UPB), respectively. The median and up-layer predicted sub-pixel MVs are calculated as described above with respect to FIGS. 3 and 4.

TABLE 1

Exemplary Prediction-Based
Directional Fractional Pixel Search Algorithm

If the block is an MPB or UPB,
    Check the search center (0, 0)
    If the block is an MPB
        Check the median predicted position
    If the block is a UPB
        Check the up-layer predicted position
    Select the point with the minimum cost $Cost_{min}$
    If $Cost_{min} < TH_i$
        Set the corresponding MV as the final MV and terminate search.
    Else
        Iterate the SDSP search around the point with the $Cost_{min}$ until
        the minimum cost point locates at the SDSP center or the
        number number of search steps reaches predefined limit (e.g., 3).
Else
    Check the search center (0, 0)
    Check the ½-pixel positions in the directions of median and up-layer
    predicted MVs respectively
    Decide the best ½-pixel position with the minimum cost
    Iterate the SDSP search around the best ½-pixel point until the point
        with the minimum cost locates at the SDSP center
Choose the minimum cost point as the final MV and stop search.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. The method for transforming video data using motion estimation via a distribution server, the method comprising:
predicting a fractional pixel motion vector via a fractional pixel motion estimation module of the distribution server using a prediction-based search, wherein the prediction-based search is terminated early if the predicted fractional pixel motion vector has a minimum cost that is less than a predefined threshold value;
refining the predicted fractional pixel motion vector based on a predicted integer pixel motion vector when the minimum cost of the predicted fractional pixel motion vector is more than the predefined threshold value;
selecting a portion of points in a block of pixels;
further refining the predicted fractional pixel motion vector using a direction search that is based on the predicted integer pixel motion vector, wherein a motion vector from a previous frame is used to determine the predicted integer pixel motion vector; and
further refining the predicted fractional pixel motion vector using a small diamond shaped pattern search, the small diamond shaped pattern search to examine fractional pixel points.

2. The method as recited in claim 1, wherein the prediction-based search comprises median prediction, where a fractional motion vector for a current block of pixels is predicted from motion vectors of adjacent blocks.

3. The method as recited in claim 2, wherein the adjacent blocks comprise a first block above the current block, a second block left of the current block, a third block diagonally above and left of the current block, and a fourth block diagonally above and right of the current block.

4. The method as recited in claim 1, wherein the prediction-based search comprises up-layer prediction, where a motion vector for a smaller block contained within a larger block in a macroblock structure is predicted, the motion vector for the larger block used as a start point to find the motion vector of the smaller block.

5. The method as recited in claim 1, further comprising using the integer pixel motion vector and the fractional pixel motion vector to code the video data.

6. A computer-readable medium storing computer-executable instructions that, when executed, perform acts comprising:
estimating an integer pixel motion vector for a block of pixels, the block of pixels part of a macroblock structure;
if the integer pixel motion vector represents a best integer pixel motion vector,
predicting one or more sub-pixel motion vectors for the block of pixels from at least one of (a) a median of motion vectors of adjacent blocks or (b) a motion vector of a larger block in the macroblock structure, the motion vector for the larger block used as a start point to find the motion vector of the block of pixels,
selecting the predicted sub-pixel motion vector with a minimum cost;
terminating the predicting one or more sub-pixel motion vectors early if the predicted one or more sub-pixel motion vectors has a minimum cost that is less than a predefined threshold value; and
refining the predicted one or more sub-pixel motion vectors based on the estimated integer pixel motion vector
if the minimum cost is more than the predefined threshold value if the minimum cost is less than the predetermined threshold, designating the selected sub-pixel motion vector as a best sub-pixel motion vector; and if the estimated integer pixel motion vector does not represent the best integer pixel motion vector, examining sub-pixel positions in the direction of the estimated integer pixel motion vector to predict one or more sub-pixel motion vectors, wherein not all sub-pixel positions in the block of pixels are examined.

7. The computer-readable medium as recited in claim 6, wherein if the minimum performance cost is not less than the predetermined threshold, performing a small diamond shape pattern search.

8. The computer-readable medium as recited in claim 6, further storing computer-executable instructions that, when executed, use the estimated integer pixel motion vector and one of the predicted sub-pixel motion vectors to code the block of pixels.

9. The video coder comprising:

the computer-readable medium of claim 6; and one or more processors to execute the instructions stored on the computer-readable medium.

* * * * *